United States Patent [19]

Kraske

[11] Patent Number: 4,833,336
[45] Date of Patent: May 23, 1989

[54] OPTICAL TRANSMITTING AND RECEIVING DEVICE FOR THE CONTACT-FREE READING OF MARKS

[75] Inventor: Bernhard Kraske, Gutach, Fed. Rep. of Germany

[73] Assignee: Gutermann & Co. A.G., Zurich, Switzerland

[21] Appl. No.: 221,020

[22] Filed: Jul. 15, 1988

Related U.S. Application Data

[63] Continuation of Ser. No. 931,241, Nov. 14, 1986, abandoned.

[30] Foreign Application Priority Data

Nov. 22, 1985 [DE] Fed. Rep. of Germany ....... 3541351

[51] Int. Cl.$^4$ ............................................. G06K 7/10
[52] U.S. Cl. .................................. 250/566; 250/237 R
[58] Field of Search ............... 250/237, 548, 557, 559, 250/566, 568, 571; 455/89, 90

[56] References Cited

U.S. PATENT DOCUMENTS

| 3,786,238 | 1/1974 | Heisner ................................ 250/566 |
| 3,937,928 | 2/1976 | Sasaki et al. ................. 235/61.11 E |
| 4,079,261 | 3/1978 | Mullin ................................. 250/570 |

FOREIGN PATENT DOCUMENTS

| 1167574 | 4/1964 | Fed. Rep. of Germany . |
| 2400334 | 1/1974 | Fed. Rep. of Germany . |
| 3027769 | 2/1982 | Fed. Rep. of Germany . |
| 2555337 | 5/1985 | France . |
| 2561804 | 9/1985 | France . |

OTHER PUBLICATIONS

Beistle, Magnetic Tape Sensing, IBM Technical Disclosure Bulletin, 1971, pp. 58,59.
Uebbing et al, Handheld Scanner Makes Reading Bar Codes Easy and Inexpensive, Hewlett-Packard Journal, pp. 3-10, Jan. 1981.

Primary Examiner—David C. Nelms
Attorney, Agent, or Firm—Baker, Maxham, Jester & Meador

[57] ABSTRACT

An optical transmitting and receiving device for the contact-free reading of marks, particularly marks and bar codes. The device has a transmitter diode arranged in a plastic body which directs an oblique transmission beam onto a reference surface outside the plastic body. A receiver diode is arranged at an angle to the transmitter diode in the plastic body, whose receiver beam is likewise directed onto a reference surface. Instead of a glass optical system simple rectangular slotted diaphrams are provided and the transmitter and receiver beams intersect at one single point of intersection in the region of the reference surface.

11 Claims, 2 Drawing Sheets

OPTICAL TRANSMITTING AND RECEIVING DEVICE FOR THE CONTACT-FREE READING OF MARKS

This is a continuation of co-pending application Ser. No. 931,241 filed on Nov. 14, 1986, now abandoned.

BACKGROUND OF THE INVENTION

The invention concerns an optical transmitting and receiving device for the contact-free reading of marks and more particularly includes transmitter and receiver diodes positively positioned with their axial beams constricted by slots and intersecting at a reference surface for high resolution reading.

Transmitting and receiving devices of this type are known from U.S. Pat. No. 4,079,261 and, in essence from IBM Technical Disclosures Bulletin Vol. 14, No. 1, June 1971, Pages 58, 59.

A disadvantage in these referenced structures is that the size of the rectangular cutout is still in the area of the dimension of the housing of the transmitter and/or receiver diode. This, combined with technical production inaccuracies in the edge area of the optical piece parts, which are mostly mass produced can lead to dispersion on the reference surface or to transition-time distortion on the receiver diode, both of which limit the accuracy and reliability of operation. Further, beam reflections can form disadvantageously on the inner face of the cutouts through which the beams pass which can impair the reading procedure with reference to the reading speed and resolution in the case of small markings. It is also disadvantageous that those cutouts, in the case of the known device, on the upper face of the plastic body, form differently-sized openings when compared with each other. Thus contamination can have a detrimental one-sided impairment of the beam path which with reference to the reading procedure causes slow-acting impairment which is often noticed too late.

From French Pat. No. 25 55 337 the insertion of a frame with an optical slotted diaphragm in the beam path of the transmitter and receiver diode is known. This is however disadvantageous in that reflections form on the side of the frame nearest to the optical parts, which can impair the accuracy of the reading. Furthermore, there exists the danger that the frame with the slotted diaphragm could slide into the beam path.

BRIEF SUMMARY OF THE INVENTION

The invention is based on the technical problem of the further development of a device of the type mentioned in the introduction to achieve an increased reliability of operation and greater reading accuracy and resolution with low production costs.

To solve the problem posed, the invention is characterized in that rectangular cut-outs are in the form of optical slotted diaphrams symmetrically arranged on the surface of the plastic body. The slots are of the same length and parallel to each other and have a width of about 0.4 mm. The focal points of the transmitter and receiver diode are arranged to be equidistant from the corresponding optical slots.

A feature of the present invention is that the slots emanate near the upper surfaces of the transmitter and receiver diode and from optical slotted diaphrams on the surface of the plastic body. This structural relationship prevents dispersions and reflections on the interior of the plastic body and also transition-time distortions.

External interference which could affect the beam path, are extensively made symmetrical and the optical slotted diaphrams are kept small. Also achieved is that the differences in the optical function of the parts of the beam path, such as the transmitter and receiver, have only minimal influence, so that parts of differing optical behaviour can be used, particularly after replacement.

A further feature of the invention is that the transmitter and receiver beam intersect at one single point of intersection in the area of the reference surface, thus achieving excellent resolution. The arrangement of rectangular slotted diaphrams as compared with circular apertures has a further advantage in that the intensity of illumination is much higher as compared with circular apertures. This is especially advantageous when it is necessary to recognise line-type marks such as barcodes.

With slotted diaphrams print of lesser quality can be read better than with circular apertures, in that small printing errors are compensated for.

In the following description the invention will be further explained by means of the drawing illustrating merely one embodiment example. Further features and advantages of the invention arise from the drawing and its description.

DETAILED DESCRIPTION

Figure 1:
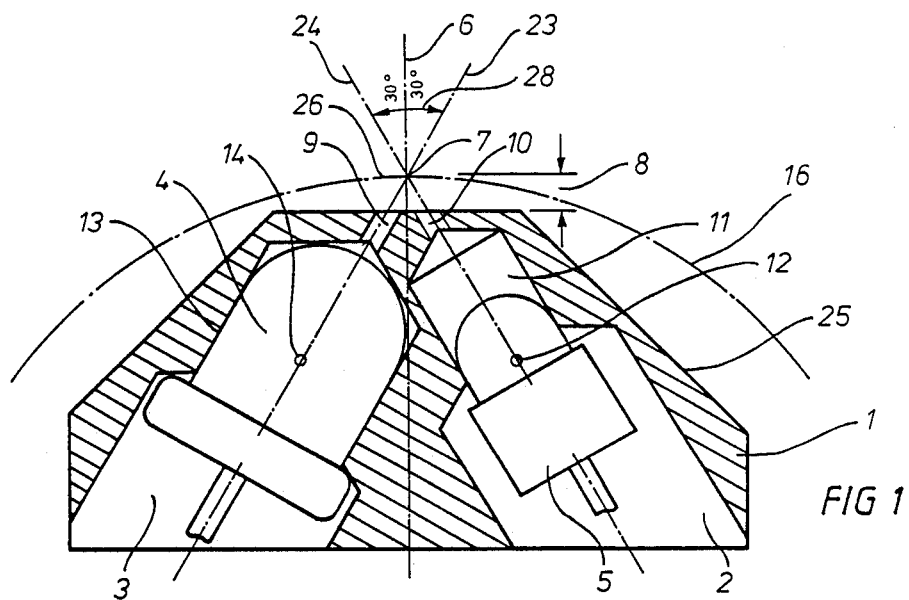
FIG. 1 is a section through a transmitter and receiver diode in accordance with the invention taken through cutting plane I—I of FIG. 2.

FIG. 1 shows a plastic body (1) in which two recesses incline towards each other at the same angle with respect to a vertical axis (6). The longitudinal axis with each cavity or recess (3) (2) forms a beam path (23) for the transmitter diode (4) set into the recess (3) and a beam path (24) for the receiver diode (5) set into the recess (2).

Both diodes (4) (5) are seated in a positive fashion in corresponding recesses (13) (11) of reduced diameter which continue the respective recesses (3) (2) in the plastic body.

The transmitter diode (4) generates the beam path (23) which forms, with the vertical axis (6), a point of intersection outside and above the plastic body (1).

The longitudinal axis of the recesses (2) (11) is so aligned that receiving diode (5) in the recess (11) sits on a receiving beam or axis (24) which intersects at the point of intersection (7). This point of intersection (7) is at a distance (8) from the surface (15) of the plastic body (1).

It is important that the focal point (12) of the receiver diode (5) lies relatively far away from the rectangular slotted diaphram (10) so that, seen from this point (12) in the direction of the slotted diaphram (10), the reading area is kept relatively narrow thus giving high resolution.

The transmitter diode (4) sits with its focal point (14) as close as possible to the slotted diaphram (10) in order to generate a high luminous density at the point of intersection (7). By means of the inserted slotted diaphram (9) however, only a narrow beam path (23) is generated at the point of intersection (7).

Figure 2:
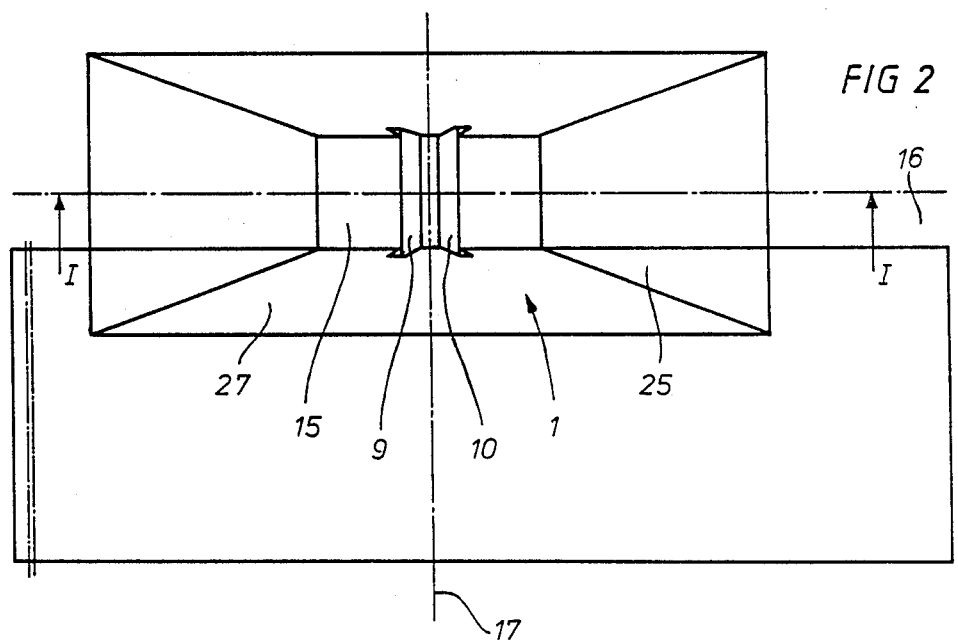
FIG. 2 is a plan view of the device in accordance with FIG. 1.

As seen in FIG. 2, both slotted diaphrams (9) (10) are approximately rectangular and are arranged in the area of a relatively narrow face (15) of the plastic body (1). From this face originate inclined side faces (25) (27) so that the face (15) is formed from a truncated pyramid.

The reason for this measure is to enable a distance wheel (16) to be arranged near one side edge of the face (15), which is rotatably mounted on the pivot axis (17).

The circumference of the distance wheel (16) passes through the point of intersection (7) whereby this distance wheel rolls on the reference surface (26) to be read. Thus it is ensured that the plastic body (1) always has the same distance (8) from the reference surface (26) with the point of intersection (7).

It is preferred if the transmitter and receiver beam paths each form an angle (28) of 30° with reference to the vertical axis (6) which effectively bisects the intersection (7) of beams (23) and (24).

Figure 3:
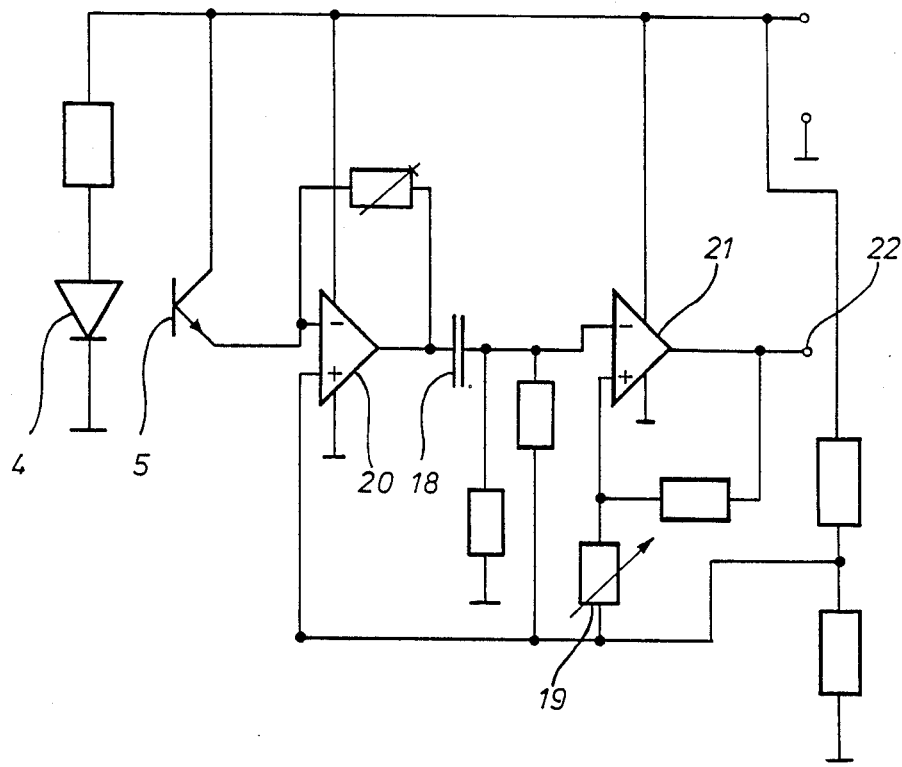
FIG. 3 is a schematic electrical circuit of the electronics for evaluating the signals produced pursuant to marks read by the device.

FIG. 3 shows a schematic electric evaluation circuit in which the transmitter diode (4) transmits a continuous light. It is preferred here if the transmitter diode (4) is formed as a green light emitting diode.

The receiver diode (5) is adjacent to the input of an amplifier (20) whose output signal is differentiated through a condenser (18). This differentiated signal is applied to the input of a Schmitt trigger (21) on whose output (22) is a digital pulse-signal. The control electrode of the Schmitt trigger is adjustable by the potentiometer (19).

The described reading arrangement therefore gives a result which is economic, relatively contamination-resistant and of high resolution, with which it is possible to achieve a resolution of 0.2 mm with a slot width of the slotted diaphram (9) (10) of approximately 0.4 mm. That is, barcodes can be read which are 0.4 mm wide and which have a distance from each other of likewise 0.4 mm.

It is a requirement here that the distance (8) is approximately between 0.5 and 0.7.

What is claimed is:

1. A device for contact-free reading of generally longitudinal markings on a reference surface, said device comprising:
   a body formed with an external face and with separate first and second cavities arranged at an angle with respect to each other and at a common angle with respect to said face and at a common angle with respect to a bisecting axis perpendicular to said face;
   transmitter diode means having a focal point with an optical axis therethrough, said transmitter diode means being positioned in said first cavity;
   receiver diode means having a focal point with an optical axis therethrough, said receiver diode means being positioned in said second cavity;
   first and second rectangular slots through said face and communicating respectively with said first and second cavities, the longitudinal dimension of the openings of said first and second slots in said face being parallel to each other and to the longitudinal direction of the markings on the reference surface to be read, said slots being substantially narrower in the longitudinal dimension than is the diameter of said first and second cavities in which said transmitter and receiver diode means are mounted, said slots functioning as collimating slots;
   means in said first and second cavities to respectively positively position said transmitter and receive diode means in juxtaposition with said collimating apertures and so that their optical axes intersect at a point outside of said cavities, the intersection point being spaced a predetermined distance from said face; and
   a distance wheel rotatably mounted to said body, said wheel having a circumference passing through said intersection point and adapted to roll on the reference surface, said distance wheel ensuring a constant distance of said face, and consequently said transmitter diode means and said receiver diode means, from the reference surface and from the markings to be read.

2. The device recited in claim 1, wherein the optical axes of said transmitter diode means and said receiver diode means each form an angle of approximately 30° with respect to said bisecting axis.

3. The device recited in claim 1, wherein said transmitter diode means is a green light emitting diode.

4. The device recited in claim 1, wherein said predetermined distance of said intersection point from said first and second rectangular slots through said face ranges between about 0.5 and 0.7 mm.

5. The device recited in claim 2, wherein said predetermined distance of said intersection point from said first and second rectangular slots through said face ranges between about 0.5 and 0.7 mm.

6. The device recited in claim 1, wherein said means in said first and second cavities for positively positioning said transmitter diode means and said receiver diode means comprises stepwise reduction of the diameter of said recess, ending in said narrow rectangular respective first and second slots.

7. The device recited in claim 2, wherein said means in said first and second cavities for positively positioning said transmitter diode means and said receiver diode means comprises stepwise reduction of the diameter of said recess, ending in said narrow rectangular respective first and second slots.

8. The device recited in claim 1, wherein said positioning means in said first and second cavities further provides means for positioning said transmitter diode means and said receiver diode means so that their respective focal points are equidistant from said intersection point.

9. The device recited in claim 2, wherein said positioning means in said first and second cavities further provides means for positioning said transmitter diode means and said receiver diode means so that their respective focal points are equidistant from said intersection point.

10. The device recited in claim 1, wherein the width of the opening of each said slot in said face is approximately 0.4 mm.

11. The device recited in claim 10, wherein said predetermined distance of said intersection point from said first and second rectangular slots through said face ranges between about 0.5 and 0.7 mm.

* * * * *